United States Patent [19]

Baggström

[11] 4,161,245

[45] Jul. 17, 1979

[54] PROCESS AND APPARATUS FOR FEEDING ELONGATED ARTICLES IN ORIENTED POSITIONS

[75] Inventor: Stig G. Baggström, Tullinge, Sweden

[73] Assignee: Telefonaktiebolaget L M Ericsson, Stockholm, Sweden

[21] Appl. No.: 865,533

[22] Filed: Dec. 29, 1977

[30] Foreign Application Priority Data

Jan. 26, 1977 [SE] Sweden .................................. 7700788

[51] Int. Cl.² ................................................. B65G 47/24
[52] U.S. Cl. ....................................................... 198/399
[58] Field of Search ............... 198/379, 389, 390, 399; 221/157, 171, 172, 173, 158

[56] References Cited

U.S. PATENT DOCUMENTS

| | | | |
|---|---|---|---|
| 2,630,221 | 3/1953 | Stewart | 221/158 |
| 2,961,080 | 11/1960 | Smith | 221/173 X |
| 3,396,830 | 8/1968 | Hoffman | 198/399 |
| 3,447,662 | 6/1969 | House | 198/399 X |
| 3,472,356 | 10/1969 | Reppert | 221/157 |

*Primary Examiner*—Robert B. Reeves
*Assistant Examiner*—James L. Rowland
*Attorney, Agent, or Firm*—Hane, Roberts, Spiecens & Cohen

[57] ABSTRACT

A process and apparatus for feeding elongated articles having enlarged heads at one end in oriented positions comprising depositing a plurality of elongated articles into a corresponding plurality of bores in a turnable member in random orientation in which the elongated articles may be introduced in some bores head-first and in other bores tail-first, and passing the articles through the bores in which they are introduced tail-first while holding the articles in the bores in which they are introduced head-first. The turnable member is turned 180° while continuing to hold the articles introduced head-first into the bores so that the articles are now inverted. The now inverted articles are then released for passage through the bores. In this way, all articles are fed from the turnable member tail-first.

13 Claims, 4 Drawing Figures

PROCESS AND APPARATUS FOR FEEDING ELONGATED ARTICLES IN ORIENTED POSITIONS

FIELD OF THE INVENTION

The present invention relates to a method and apparatus for turning elongated or oblong objects, expanded at one end to form a head in relation to the rest of the object, so as to orient the objects with the heads in the same, determined direction.

PRIOR ART

When very small objects such as elongated contact springs of a length of one centimeter are to be arranged in the same direction, previously known apparatus and methods do not offer satisfactory results. It has been customary for the objects to be fed along a feeder trough and objects directed in one manner, have been made to fall into a first outlet in order to be turned, whereas objects directed in a contrary manner, have been transmitted to a second outlet and have not been turned. When the objects are very small, the force of gravity is insufficient for separating objects of different orientation. In addition, residual magnetism of the objects or of the sorting plant can cause disturbing forces of the same magnitude as the gravity. Sorting plants of known type have for those reasons, inter alia, operated with uncertainty and slowly.

It is contemplated according to the invention to provide a process and apparatus for actively holding and turning the objects from an incorrect orientation to a proper orientation.

SUMMARY OF THE INVENTION

With the process and apparatus according to the invention, the objects become correctly oriented faster and more carefully than with the previously known processes and apparatus.

BRIEF DESCRIPTION OF THE DRAWINGS

The following description of the process and apparatus in accordance with the invention is given referring to the drawing, wherein.

DETAILED DESCRIPTION

Figure 1:
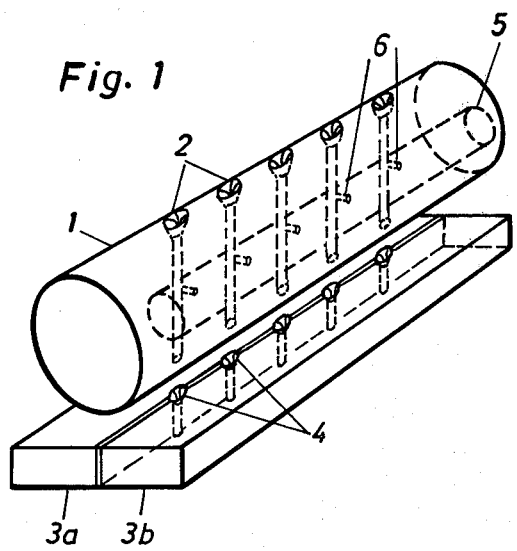
FIG. 1 is a perspective view of the apparatus according to one embodiment of the invention.

In accordance with the invention, the apparatus comprises a rotatable cylinder 1, shown in FIG. 1, arranged to be rotated 180° by means of a suitable revolving means. The revolving means can be made of any type, i.e., hydraulic, pneumatic or electromagnetic driving, and, since the kind of revolving means is of little significance for the invention it is excluded from FIG. 1. The cylinder 1 is provided with several diametrical channels bores 2, the diameter of which is sufficient to permit the passage of oblong or elongated objects or articles having enlarged heads B and tails A. The channels 2 have conical countersinks at both ends.

An enlongated member or ruler comprising two parts 3a, 3b, is arranged underneath and parallel to the cylinder 1. The ruler is provided with a number of holes 4 aligned with corresponding channels 2 in the cylinder 1. The holes 4 are enlarged with a conical countersink at the end directed towards the cylinder. In one embodiment according to the invention eighteen channels 2 are provided in the cylinder 1 and corresponding holes 4 in the ruler 3a, 3b. However, for the sake of simplicity, the drawing shows only five holes and channels.

Figure 2:
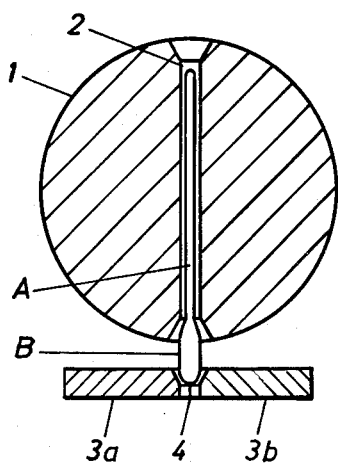
FIG. 2 is a sectional view through the apparatus showing the condition in which articles are introduced head-first therein.
Figure 3:
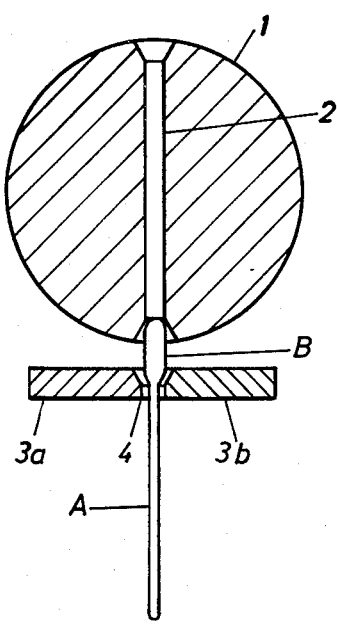
FIG. 3 is a similar sectional view showing the condition in which articles are introduced tail-first.

FIGS. 2 and 3 show a cross section through the cylinder 1 and the ruler 3a, 3b for two separate channels. The cross sections through the revolving cylinder and the ruler are identical in both figures. FIG. 2 shows how an oblong object introduced head-first into channel 2 is stopped by engagement of head B in the hole 4 with its tail part A remaining in the channel in the cylinder. The channel 2 in the cylinder has such a diameter that it allows the head B of the object to pass therethrough. The hole 4 in the ruler has a smaller diameter than the channel 2 so that only the tail part A of the object is allowed to pass therethrough, while its head B is prevented from passing through the hole. FIG. 3 shows another object which has been introduced tail-first into channel 2 and passes into the hole 4 in the ruler and become suspended by the engagement of head B in the hole 4, the latter having a diameter preventing head B from passing through the hole 4.

The objects which are to be oriented in accordance with the invention, are contact springs made of steel, with a total length of 28 millimeters; the diameter of the tail part A is 0.5 millimeters; the breadth of the enlarged head B is 1 millimeter. The apparatus can handle objects of different dimensions, as long as their length is at the most of the same size as the diameter of the cylinder 1.

Figure 4:
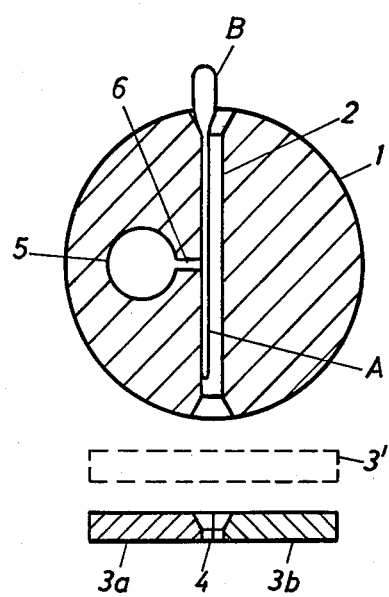
FIG. 4 is a sectional view showing the arrangement in FIG. 2 in which a turnable cylinder member has been rotated 180° to inert the article.

As shown in FIG. 4, the ruler 3a, 3b is movable from the position shown in dotted lines at 3', to the position in solid lines. The cylinder 1 in FIG. 4 is rotated 180° in relation to the position shown in FIG. 2. During the rotation, the contact spring which has been introduced into channel 2 head-first is held in the cylinder by means of a vacuum developed in vacuum channel 5 and a narrow connection tube 6. The vacuum channel 5 and the connection tube 6 for each channel 2, are also shown in FIG. 1, but for the sake of simplicity have been excluded from FIG. 2 and FIG. 3.

By using the described arrangement, the contact springs are turned and oriented in the following manner:

With a feeder of a known kind, e.g., arranged for holding the contact springs by means of vacuum, the contact springs are fed from a hopper in batches which correspond with the described cylinder 1, i.e., eighteen contact springs in the described example. The contact springs are fed from above into the channels 2 in the cylinder 1, whereby some of the contact springs are fed head-first and other contact elements are fed tail-first. Those contact springs which have been fed heads first have their heads blocked by the respective holes in the ruler 3a, 3b arranged underneath the cylinder 1 with their tails A remaining in the channels 2 in the cylinder 1. However, the springs which were fed into the channels, pass through the cylinder completely and become suspended in respective holes 4 in the ruler 3a, 3b, by their enlarged heads B.

Those contact springs whose tails remain inside the cylinder, have an incorrect position, shown in FIG. 2, and must be turned 180°. For this purpose the contact springs are held in the cylinder 1 by the vacuum developed in vacuum channels 5 and 6.

The ruler 3a, 3b with those contact springs that already are suspended in respective holes in the ruler, are lowered in the manner shown in FIG. 4, so that the contact springs held in the cylinder are freed from the holes in the ruler.

The cylinder 1, with the contact springs held therein by the vacuum, is turned 180°. Thus the springs now assume the position shown in FIG. 4.

The ruler 3a, 3b is raised to its original position 3'. Subsequently, the contact springs held in the cylinder are released by release of the vacuum, whereby the springs each drop through the hole in the ruler and become suspended by their heads in the holes. As a result all of the springs are suspended in the holes in the ruler with their enlarged heads directed upwards towards cylinder 1.

In one variant of the described arrangement, the ruler's holes 4 can be designed so that those contact springs that are held in the revolving cylinder are free to be rotated by the cylinder without a preceding lowering of the ruler.

In an additional variant of the described arrangement, the cylinder 1 and the ruler 3a, 3b are constructed to receive only one object at a time.

For transportation of the objects, by the arrangement described, the effect of gravity has been used. The invention can also be applied in other cases where the force for transportation of the objects is effected in another way, e.g., magnetically.

The objects are held in the cylinder by means of a vacuum in the described apparatus. It is also possible to hold the objects by other means, e.g., by mechanical means that are driven pneumatically or hydraulically.

When the objects have been arranged in the ruler, all of them having their enlarged heads B directed towards the revolving cylinder, they are fed for further treatment. In the described apparatus, this is effected by separating the parts 3a and 3b. Hereby all objects fall tail-first.

We claim:

1. A method of feeding elongated articles having enlarged heads at one end, said method comprising depositing a plurality of elongated articles into a correspond plurality of bores in a turnable member in random orientation in which the elongated articles may be introduced in some bores head-first and in other bores tail-first, passing the articles through the bores in which they are introduced tail-first, holding the articles in the bores in which they are introduced head-first, turning the turnable member 180° while continuing to hold the articles introduced head-first into the bores so that said articles are now inverted and releasing the now inverted articles for passage through the bores.

2. A method as claimed in claim 1 wherein said bores are oriented vertically and the articles are introduced therein under the effect of gravity and those articles which are introduced tail-first pass through the bores under the effect of gravity.

3. A method as claimed in claim 2 wherein the articles are held in the bores during turning of the turnable member by developing a vacuum in said bores.

4. A method as claimed in claim 1 wherein the turnable member is formed as a cylinder and said bores are disposed diametrically through the cylinder.

5. A method as claimed in claim 1 wherein the articles which are introduced head-first into the bores are held in said bores by positioning a blocking member adjacent the turnable member so that the heads of the articles are blocked by the blocking member and the articles cannot pass through the bores.

6. A method as claimed in claim 5 comprising forming said blocking member with openings permitting passage of the tails of the articles therethrough but blocking passage of the heads, and relatively moving said blocking member and said turnable member away from one another prior to turning of the turnable member.

7. Apparatus for feeding elongated articles having enlarged heads at one end and tails extending from said heads, said apparatus comprising a turnable member having through passages therein in which articles can be introduced in head-first or tail-first orientation, said passages being dimensioned to permit passage of the articles therethrough, said turnable member being turnable between a first position in which the articles are introduced into respective passages and a second position offset angularly by 180° from said first position, means for blocking passage of articles introduced head-first into the passages while permitting passage of the articles introduced tail-first into the passages, and means for holding the blocked articles in said passages while the turnable member is rotated from said first to said second position such that the articles are inverted, said holding means then being releasable to permit the now inverted articles to pass through the passage.

8. Apparatus as claimed in claim 7 wherein said passages are inclined with respect to the horizontal in said first and second positions so that said articles travel in said passages under the effect of gravity.

9. Apparatus as claimed in claim 8 wherein said passages are vertical in said first and second positions.

10. Apparatus as claimed in claim 9 wherein said blocking means is located beneath said turnable member and comprises a blocking member having holes in correspondence with said passages, said holes being dimensioned to permit passage of the tails of the articles while blocking the heads of the articles.

11. Apparatus as claimed in claim 10 wherein the means for holding the blocked articles in the passages while the turnable member is rotated comprises means for developing a vacuum in said passages to hold the blocked articles therein.

12. Apparatus as claimed in claim 11 wherein the turnable member and the blocking member are relatively movable apart.

13. Apparatus as claimed in claim 12 wherein said turnable member is a cylindrical member rotatable about a horizontal axis, said passages extending diametrically through said cylindrical member, said blocking member comprising an elongated two-part member extending parallel to said cylindrical member, the two parts of said elongated member being separable along a joint line through which said holes extend.

* * * * *